United States Patent
Omer et al.

(10) Patent No.: US 10,051,414 B1
(45) Date of Patent: Aug. 14, 2018

(54) DETECTING MOTION BASED ON DECOMPOSITIONS OF CHANNEL RESPONSE VARIATIONS

(71) Applicant: Cognitive Systems Corp., Waterloo (CA)

(72) Inventors: Mohammad Omer, Waterloo (CA); Christopher Vytautas Olekas, Breslau (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 15/691,195

(22) Filed: Aug. 30, 2017

(51) Int. Cl.
*H04W 24/00* (2009.01)
*H04W 4/02* (2018.01)
*G01S 5/02* (2010.01)

(52) U.S. Cl.
CPC ............. *H04W 4/02* (2013.01); *G01S 5/0273* (2013.01)

(58) Field of Classification Search
CPC .............................. H04W 4/02; G01S 5/0273
USPC ........................................................ 455/456.1
See application file for complete search history.

(56) References Cited

U.S. PATENT DOCUMENTS

| | | | |
|---|---|---|---|
| 4,054,879 A | 10/1977 | Wright et al. | |
| 4,075,573 A | 2/1978 | Kennedy et al. | |
| 4,193,055 A | 3/1980 | Barnum | |
| 4,225,858 A | 9/1980 | Cole et al. | |
| 4,286,260 A | 8/1981 | Gershberg et al. | |
| 4,649,388 A | 3/1987 | Atlas | |
| 4,740,045 A | 4/1988 | Goodson et al. | |
| 4,870,663 A | 9/1989 | Kulju et al. | |
| 5,270,720 A | 12/1993 | Stove | |
| 5,519,400 A | 5/1996 | McEwan | |
| 5,696,514 A | 12/1997 | Nathanson et al. | |
| 6,075,797 A | 6/2000 | Thomas | |
| 6,493,380 B1 | 12/2002 | Wu et al. | |
| 6,573,861 B1 | 6/2003 | Hommel et al. | |

(Continued)

FOREIGN PATENT DOCUMENTS

| | | |
|---|---|---|
| CA | 2834522 | 5/2014 |
| CA | 2945702 | 8/2015 |

(Continued)

OTHER PUBLICATIONS

Canadian Intellectual Property Office, International Search Report and Written Opinion for International Application No. PCT/CA2017/050037 dated Apr. 13, 2017, 12 pages.

(Continued)

*Primary Examiner* — Huy C Ho
(74) *Attorney, Agent, or Firm* — Henry Patent Law Firm PLLC

(57) ABSTRACT

In a general aspect, motion is detected using vector representations of channel responses. In some aspects, a first set of channel responses are obtained based on wireless signals transmitted through a space during a first time period. From the first set of channel responses, a set of orthogonal axes in a frequency vector domain are determined. A second channel response is obtained based on a wireless signal transmitted through the space during a second time period, and a channel vector representing the second channel response in the frequency vector domain is determined. Motion of an object in the space is detected based on a projection of the channel vector onto one of the set of orthogonal axes.

26 Claims, 9 Drawing Sheets

(56) References Cited

U.S. PATENT DOCUMENTS

| | | |
|---|---|---|
| 7,047,015 B2 | 5/2006 | Hawe |
| 7,295,109 B2 | 11/2007 | Kobayashi |
| 7,317,419 B2 | 1/2008 | Sugar et al. |
| 7,652,617 B2 | 1/2010 | Kurtz et al. |
| 7,916,066 B1 | 3/2011 | Osterweil |
| 8,138,918 B2 | 3/2012 | Habib |
| 8,331,498 B2 | 12/2012 | Huang et al. |
| 8,477,750 B2 | 7/2013 | Agarwal et al. |
| 8,710,984 B2 | 4/2014 | Wilson et al. |
| 8,818,288 B2 | 8/2014 | Patwari et al. |
| 8,836,344 B2 | 9/2014 | Habib et al. |
| 9,030,321 B2 | 5/2015 | Breed |
| 9,143,413 B1 | 9/2015 | Manku et al. |
| 9,143,968 B1 | 9/2015 | Manku et al. |
| 9,523,760 B1 | 12/2016 | Kravets et al. |
| 9,524,628 B1 | 12/2016 | Omer et al. |
| 9,551,784 B2 | 1/2017 | Katuri et al. |
| 9,584,974 B1 | 2/2017 | Omer et al. |
| 9,743,294 B1 | 8/2017 | Omer et al. |
| 9,927,519 B1 | 3/2018 | Omer et al. |
| 9,933,517 B1 | 4/2018 | Olekas et al. |
| 2001/0046870 A1 | 11/2001 | Stilp et al. |
| 2003/0007473 A1 | 1/2003 | Strong et al. |
| 2003/0108119 A1 | 6/2003 | Mohebbi et al. |
| 2005/0055568 A1 | 3/2005 | Agrawala et al. |
| 2005/0083199 A1 | 4/2005 | Hall et al. |
| 2006/0217132 A1 | 9/2006 | Drummond-Murray et al. |
| 2007/0293232 A1 | 12/2007 | Nonaka |
| 2008/0119130 A1 | 5/2008 | Sinha |
| 2008/0240008 A1 | 10/2008 | Backes et al. |
| 2008/0303655 A1* | 12/2008 | Johnson ............. G01S 13/0209 340/539.16 |
| 2009/0040952 A1 | 2/2009 | Cover et al. |
| 2009/0062696 A1 | 3/2009 | Nathan et al. |
| 2009/0079615 A1 | 3/2009 | Wu et al. |
| 2009/0128302 A1 | 5/2009 | Srinivasan et al. |
| 2009/0128360 A1 | 5/2009 | Bianchi et al. |
| 2010/0013636 A1 | 1/2010 | Wu |
| 2010/0026490 A1 | 2/2010 | Butler et al. |
| 2010/0103020 A1 | 4/2010 | Wu |
| 2010/0315284 A1 | 12/2010 | Trinza et al. |
| 2011/0130092 A1 | 6/2011 | Yun et al. |
| 2011/0148689 A1 | 6/2011 | Filippi et al. |
| 2012/0009882 A1 | 1/2012 | Patwari et al. |
| 2012/0011365 A1 | 1/2012 | Schmidt et al. |
| 2012/0115512 A1 | 5/2012 | Grainger et al. |
| 2012/0146788 A1 | 6/2012 | Wilson et al. |
| 2012/0184296 A1 | 7/2012 | Milosiu |
| 2012/0212366 A1 | 8/2012 | Alalusi |
| 2013/0005280 A1 | 1/2013 | Leung et al. |
| 2013/0090151 A1 | 4/2013 | Ngai et al. |
| 2013/0162459 A1 | 6/2013 | Aharony et al. |
| 2013/0283256 A1 | 10/2013 | Proud |
| 2014/0004874 A1 | 1/2014 | Schwartz et al. |
| 2014/0015706 A1 | 1/2014 | Ishihara et al. |
| 2014/0128778 A1 | 5/2014 | Chan et al. |
| 2014/0135042 A1 | 5/2014 | Buchheim et al. |
| 2014/0140231 A1 | 5/2014 | Haiut et al. |
| 2014/0247179 A1 | 9/2014 | Furuskog |
| 2014/0285324 A1 | 9/2014 | Austin |
| 2014/0286380 A1 | 9/2014 | Prager et al. |
| 2014/0301260 A1 | 10/2014 | Park et al. |
| 2015/0043377 A1 | 2/2015 | Cholas et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0189528 A1 | 7/2015 | Carbajal |
| 2015/0195100 A1 | 7/2015 | Imes et al. |
| 2015/0212205 A1 | 7/2015 | Shpater |
| 2015/0245164 A1 | 8/2015 | Merrill |
| 2015/0292879 A1 | 10/2015 | Zhou et al. |
| 2015/0338507 A1 | 11/2015 | Oh et al. |
| 2015/0350976 A1 | 12/2015 | Kodali et al. |
| 2016/0018508 A1 | 1/2016 | Chen et al. |
| 2016/0183059 A1 | 6/2016 | Nagy et al. |
| 2016/0187475 A1 | 6/2016 | Horng et al. |
| 2016/0210838 A1 | 7/2016 | Yan et al. |
| 2016/0241999 A1 | 8/2016 | Chin et al. |
| 2017/0042488 A1 | 2/2017 | Muhsin |
| 2017/0146656 A1* | 5/2017 | Belsley ................. G01S 17/58 |
| 2017/0195893 A1 | 7/2017 | Lee et al. |
| 2017/0309146 A1 | 10/2017 | MacKenzie et al. |
| 2017/0343658 A1 | 11/2017 | Ramirez et al. |

FOREIGN PATENT DOCUMENTS

| | | |
|---|---|---|
| WO | 2014/021574 | 2/2014 |
| WO | 2014201574 | 12/2014 |
| WO | 2015/168700 | 11/2015 |

OTHER PUBLICATIONS

USPTO, Notice of Allowance issued in U.S. Appl. No. 15/461,125 dated Aug. 30, 2017, 15 pages.

Canadian Intellectual Property Office, International Search Report and Written Opinion issued International Application No. PCT/CA2016/051228 dated Apr. 25, 2017, 8 pages.

Canadian Intellectual Property Office, International Search Report and Written Opinion issued in International Application No. PCT/CA2016/051466 dated Mar. 14, 2017, 9 pages.

Apple Insider; "Intel to reportedly supply LTD chips for 2016 iPhone"; http://appleinsider.com/articles/15/03/11/intel-to-reportedly-supply-ltd-chips-for-2016-iphone; 2 pages; May 15, 2016.

CEVA; "CEVA'S DSP Cores Power the World's Leading Mobile Broadband and M2M Applications"; http://www.ceva-dsp.com/Mobile-Broadband; 3 pages; May 15, 2016.

Japan Radio Co., Ltd; "26GHz FWA—Technology"; http://www.jrc.co.jp/eng/product/lneup/26ghz_wireless_ip_access_system/tech.html; 3 pages; May 15, 2016.

USPTO, Non-Final Office Action received in U.S. Appl. No. 15/099,833, dated Jun. 27, 2016, 16 pages.

USPTO, Non-Final Office Action received in U.S. Appl. No. 15/151,571, dated Aug. 5, 2016, 18 pages.

USPTO, Notice of Allowance received in U.S. Appl. No. 15/099,833, dated Oct. 14, 2016, 8 pages.

USPTO, Notice of Allowance received in U.S. Appl. No. 15/151,571, dated Jan. 10, 2017, 9 pages.

USPTO, Notice of Allowance received in U.S. Appl. No. 15/228,418, dated Oct. 12, 2016, 9 pages.

Quora.com; "What is the function of the baseband processor in wireless devices?"; https://ww.quora.com/What-is-the-function-of-the-baesband-processor-in-wireless-devices; 2 pages; May 15, 2016.

Wikipedia; "Baseband processor"; rhttps://en.wikipedia.org/wiki/Bandband_processor; 2 pages; version dated Apr. 20, 2016.

Canadian Intellectual Property Office, "International Search Report and Written Opinion", in International Application No. PCT/CA2016/051229, dated Jan. 17, 2017, 9 pages.

Netgear , "N600 Wifi Cable Modem Router, Model C3700 User Manual", https://web.archive.org/web/20150121182848/http://www.downloads.netgear.com/files/GDC/C3700_UM_21Aug2014.pdf (archive of URL http://www.downloads.netgear.com/files/GDC/C3700_UM_21Aug2014.pdf captured on Jan. 21, 2015, 101 pages.

Openwrt, "Wireless Configuration", https://web.archive.org/web/20140402033233/http://wiki.openwrt.org/doc/uci/wireless (capture of URL http://wiki.openwrt.org/doc/uci/wireless on Apr. 2, 2014), 22 pages.

USPTO, Final Office Action received in U.S. Appl. No. 15/176,489 dated Jun. 23, 2017, 23 pages.

USPTO, Notice of Allowance issued in U.S. Appl. No. 15/460,643 dated Jun. 12, 2017, 34 pages.

USPTO, Non-final Office Action issued in U.S. Appl. No. 15/461,125 dated Apr. 19, 2017, 56 pages.

USPTO, "Non-final Office Action", issued in U.S. Appl. No. 15/176,489 dated Mar. 22, 2017, 41 pages.

USPTO; Restriction Requirement dated Jan. 23, 2018, in U.S. Appl. No. 15/706,295.

(56) References Cited

OTHER PUBLICATIONS

USPTO, Notice of Allowance dated Jan. 29, 2018, in U.S. Appl. No. 15/461,125, 16 pgs.
USPTO, Notice of Allowance dated Feb. 13, 2018, in U.S. Appl. No. 15/683,637, 25 pgs.
USPTO, Notice of Allowance dated Jan. 10, 2018, in U.S. Appl. No. 15/803,189, 28 pgs.
USPTO, Non-Final Office Action dated Feb. 7, 2018, in U.S. Appl. No. 15/176,489, 30 pgs.
USPTO, Non-Final Office Action dated Dec. 28, 2017, in U.S. Appl. No. 15/789,761, 31 pgs.
USPTO; Non-Final Office Action dated Jan. 23, 2018, in U.S. Appl. No. 15/789,815, 35 pgs.
USPTO, Non-Final Office Action dated Jan. 26, 2018, in U.S. Appl. No. 15/815,199, 36 pgs.
USPTO, Non-Final Office Action received in U.S. Appl. No. 15/799,768 dated Dec. 13, 2017, 7 pgs.
CIPO, International Search Report and Written Opinion dated Jan. 26, 2018, in PCT/CA2017/051290, 9 pgs.
Wei, et al., "Radio-based Device-free Activity Recognition with Radio Frequency Interference", IPSN '15 Proceedings of the 14th International Conference on Information Processing in Sensor Networks, Apr. 13-16, 2015, 12 pgs.
Youssef, Moustafa, et al., "Challenges: Device-free Passive Localization for Wireless Environments", Mobicom 07 Proceedings of the 13th Annual ACM International Conference on Mobile Computing and Networking, Sep. 2007, 31 pgs.
Zheng, et al., "Detecting Radio Frequency Interference for CSI Measurements on COTS WiFi Devices", IEEE ICC 2017, Ad-Hoc and Sensor Networking Symposium, May 2017, 6 pgs.
USPTO, Non-Final Office Action dated Mar. 14, 2018, in U.S. Appl. No. 15/706,295, 39 pgs.
USPTO, Notice of Allowance dated Mar. 8, 2018, in U.S. Appl. No. 15/706,193, 40 pgs.
USPTO, Non-Final Office Action dated Mar. 9, 2018, in U.S. Appl. No. 15/836,606, 49 pgs.
USPTO, Restriction Requirement dated Mar. 28, 2018, in U.S. Appl. No. 15/799,806, 5 pgs.
CIPO, International Search Report and Written Opinion dated Feb. 9, 2018, in PCT/CA2017/051276, 9 pgs.
Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.
Hyder, et al., "Acoustic Scene Classification using a CNN-SuperVector system trained with Auditory and Spectrogram Image Features", Interspeech 2017, Stockholm Sweden, Aug. 20-24, 2017, 5 pgs.
Li, et al., "A Convolutional Neural Network Cascade for Face Detection", IEEE, 2015, 10 pgs.
Tsironi, et al., "Gesture Recognition with a Convolutional Long Short-Term Memory Recurrent Neural Network", European Symposium on Artificial Neural Networks, Computational Intelligence and Machine Learning, Bruges (Belgium), Apr. 27-29, 2016, 6 pgs.
Zheng, et al., "Time Series Classification Using Multi-Channels Deep Convolutional Neural Networks", 2014, 13 pgs.

* cited by examiner

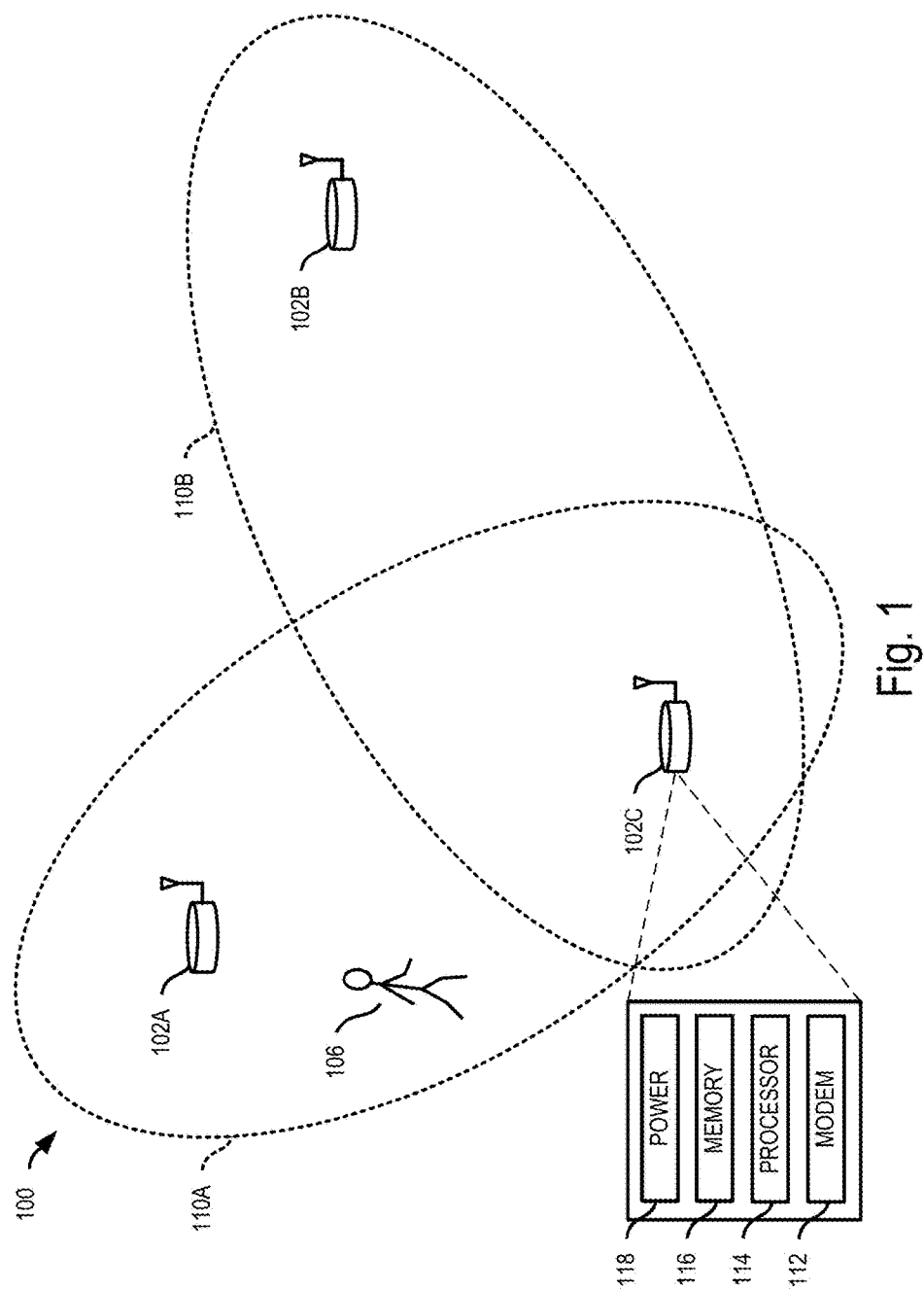

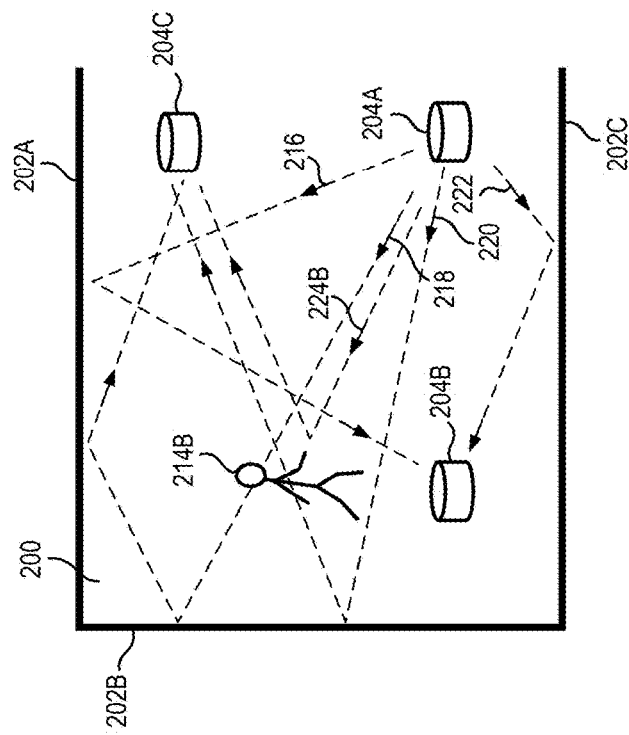
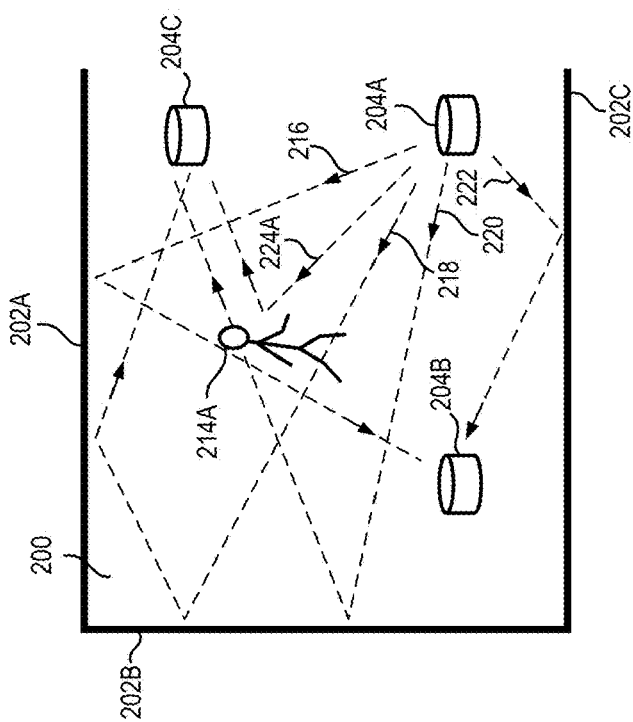
Fig. 2A
Fig. 2B

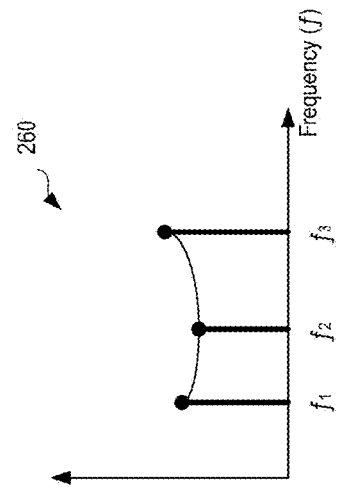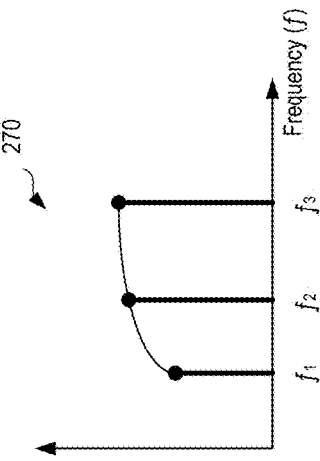
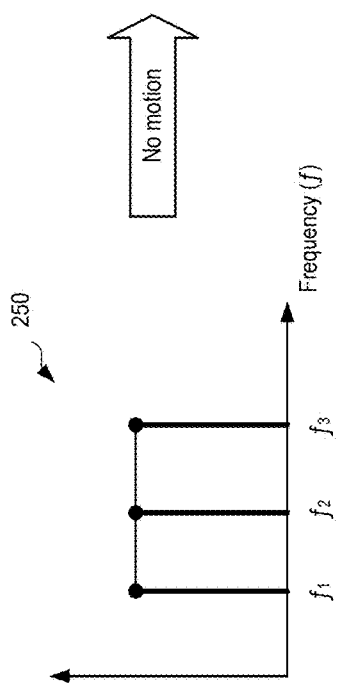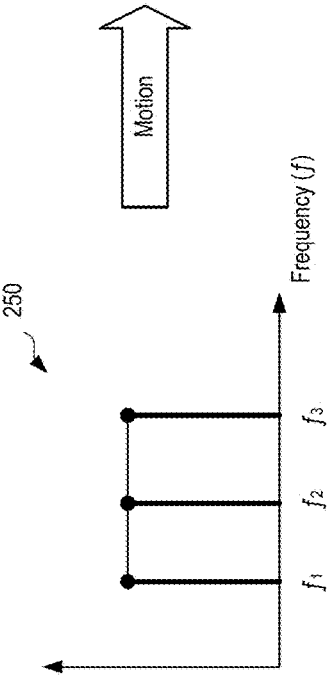
Fig. 2C            Fig. 2D

DETECTING MOTION BASED ON DECOMPOSITIONS OF CHANNEL RESPONSE VARIATIONS

BACKGROUND

The following description relates to motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIG. 1 is a diagram showing an example wireless communication system.

FIGS. 2A and 2B are diagrams showing example signals communicated between wireless communication devices.

FIGS. 2C-2D are plots showing examples of channel responses computed from the wireless signals communicated between wireless communication devices in FIGS. 2A-2B.

DETAILED DESCRIPTION

Figure 3:
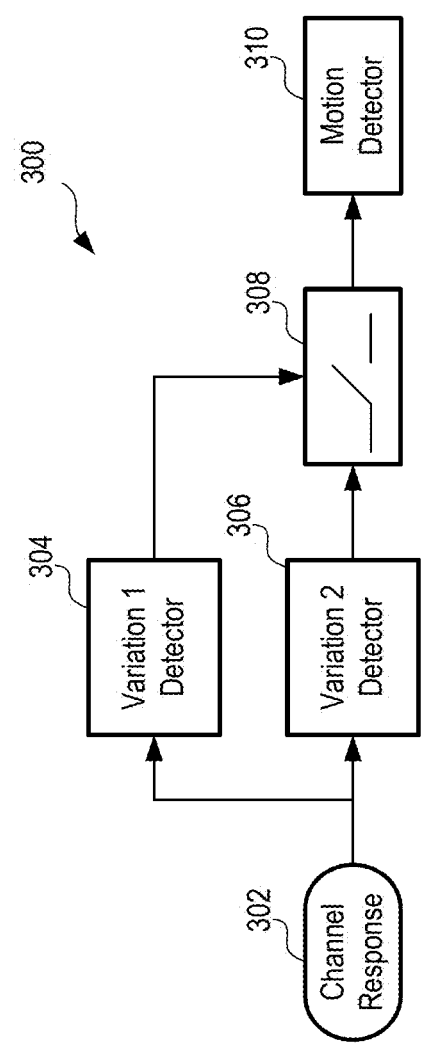
FIG. 3 is a block diagram of an example system for detecting motion based on different types of variations in channel responses.

In some aspects of what is described here, motion in a space can be detected based on decompositions of channel response variations. For example, motion may be detected in response to detecting multiple different types of variations in a channel response. Channel responses can be obtained based on wireless signals (e.g., radio frequency signals) transmitted through the space. For example, a motion detection system may be programmed to compute a channel response based on wireless signals communicated (e.g., from a transmitter device to a receiver device) through the space over a time period. If an object moves in the space that is probed by the wireless signals, the channel response will vary over time; thus, motion of an object in the space can be detected by analyzing variations in the channel response over time. However, wireless interference and other phenomena may also cause the channel response to vary over time; thus, it is also useful to detect and analyze variations in the channel responses that are not attributable to motion.

In some instances, a first type of variation in a channel response is associated with interference (e.g., out-of-band (OOB) or out-of-channel (OOC) interference) and thus unwanted as an input to a motion detection process, while a second type of variation in the channel response may indicate motion in a space and is accordingly preferred (versus the first type of variation) as an input to the motion detection process. When a magnitude of the first type of variation is above a certain level, the first type of variation (e.g., interference) may cause the motion detection process to produce errors, such as false-positives. Accordingly, the magnitude of the first type of variation may be used as a gate for allowing or preventing execution of the motion detection process based on information about the second type of variation. For example, when the magnitude of the first variation is above a threshold, information about the second type of variation may be prevented from being passed to the motion detection process or the process may be prevented from being executed. However, when the magnitude of the first variation is below the threshold, the motion detection process may be executed based on information associated with the second type of variation.

In some aspects, the different types of variations may be detected by constructing vector representations of the channel responses. For example, a channel vector representing a channel response may be constructed in a frequency vector domain based on the subcarrier frequency components of the channel response. As the channel response changes (e.g., due to motion or interference in a space), the elements of the channel vector will also change. In some implementations, channel responses based on interference (e.g., out-of-band (OOB) or out-of-channel (OOC) interference) or other signals not associated with motion may correspond to channel vectors that are substantially aligned with a particular direction in the frequency vector domain, while channel responses associated with motion may correspond to channel vectors that are not substantially aligned with that particular direction (e.g., channel vectors having components in at least one different (e.g., orthogonal) direction in the frequency vector domain).

In some implementations, to detect motion based on channel responses, a set of axes in the frequency vector domain may be defined based on a set of channel responses for a space. A first axis (or a first set of axes) may be defined based on the direction channel vectors typically align with when only interference is present in the space, and the other axes may be defined as orthogonal to the first axis (or orthogonal to the first set of axes). When a new channel response is obtained, a channel vector representing the new channel response may be analyzed to determine how the channel vector projects on the axes. If the channel vector projects substantially on the first axis (or one or more of the first set of axes) and little on the other axes, then it may be determined that the channel vector (and thus, the channel response) is not associated with motion. On the other hand, if the channel vector projects substantially (e.g., the projection is above a threshold) onto one or more of the other axes orthogonal to the first axis, then the channel response may be determined to be associated with motion in the space. In some implementations, the axes are updated based on the most recently-received channel responses. The axes may be initially defined and updated using a least squares method or another regressive analysis method. Accordingly, the first axis (or first set of axes) and associated thresholds may define an interference region of the frequency vector domain, which is associated with interference only, and channel responses that map to channel vectors outside the interference region may indicate motion in the space.

The systems and techniques describe here may provide one or more advantages in some instances. For example, motion of an object may be detected based on wireless signals (e.g., radio frequency (RF) signals) received by a wireless communication device, without the need for clear line-of-sight. In addition, motion may be detected more accurately. For example, variations caused by interference signals may be accurately isolated in the motion detection process from those caused by motion. In some cases, the radio subsystem that processes the wireless signals may be sensitive to out-of-band (OOB) or out-of-channel (OOC) interference, and the techniques described here can effectively filter such effects from the motion detection process. Accordingly, variations in the radio subsystem can be decomposed and isolated to improve the accuracy of motion detection based on radio signals.

FIG. 1 is a diagram showing an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices and other components (e.g., additional wireless communication devices, one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1, the wireless communication devices 102A, 102B, 102C can be, or they may include, standard wireless network components; for example, a conventional Wi-Fi access point or another type of wireless access point (WAP) may be used in some cases. In some cases, another type of standard or conventional Wi-Fi transmitter device may be used. The wireless communication devices 102A, 102B, 102C may be implemented without Wi-Fi components; for example, other types of standard or non-standard wireless communication may be used for motion detection. In some cases, the wireless communication devices 102A, 102B, 102C can be, or they may be part of, a dedicated motion detection system.

As shown in FIG. 1, the example wireless communication device 102C includes a modem 112, a processor 114, a memory 116, and a power unit 118; any of the wireless communication devices 102A, 102B, 102C in the wireless communication system 100 may include the same, additional or different components, and the components may be configured to operate as shown in FIG. 1 or in another manner. In some implementations, the modem 112, processor 114, memory 116, and power unit 118 of a wireless communication device are housed together in a common housing or other assembly. In some implementations, one or more of the components of a wireless communication device can be housed separately, for example, in a separate housing or other assembly.

The example modem 112 can communicate (receive, transmit, or both) wireless signals. For example, the modem 112 may be configured to communicate radio frequency (RF) signals formatted according to a wireless communication standard (e.g., Wi-Fi or Bluetooth). In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the modem 112 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency (RF) signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 112 can communicate wireless network traffic (e.g., data packets) in the wireless communication network through the radio subsystem on one or more network traffic channels. The baseband subsystem of the modem 112 may also transmit or receive (or both) signals (e.g., motion probe signals or motion detection signals) through the radio subsystem on a dedicated wireless communication channel. In some instances, the baseband subsystem generates motion probe signals for transmission, for example, in order to probe a space for motion. In some instances, the baseband subsystem processes received motion detection signals (signals based on motion probe signals transmitted through the space), for example, to detect motion of an object in a space.

The example processor 114 can execute instructions, for example, to generate output data based on data inputs. The instructions can include programs, codes, scripts, or other types of data stored in memory. Additionally or alternatively, the instructions can be encoded as pre-programmed or re-programmable logic circuits, logic gates, or other types of hardware or firmware components. The processor 114 may be or include a general purpose microprocessor, as a specialized co-processor or another type of data processing apparatus. In some cases, the processor 114 performs high level operation of the wireless communication device 102C. For example, the processor 114 may be configured to execute or interpret software, scripts, programs, functions, executables, or other instructions stored in the memory 116. In some implementations, the processor 114 may be included in the modem 112.

The example memory 116 can include computer-readable storage media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the wireless communication device 102C. The memory 116 may store instructions that are executable by the processor 114. For example, the instructions may include instructions for detecting motion based on variations in channel responses, such as through process 400 of FIG. 4 or process 8 of FIG. 8.

The example power unit 118 provides power to the other components of the wireless communication device 102C. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., an AC adapter) that receives an external power signal (from an external source) and coverts the external power signal to an internal power signal conditioned for a component of the wireless communication device 102C. The power unit 118 may include other components or operate in another manner.

In the example shown in FIG. 1, the wireless communication devices 102A, 102B transmit wireless signals (e.g., according to a wireless network standard, a motion detection protocol, or otherwise). For instance, wireless communication devices 102A, 102B may broadcast wireless signals (e.g., reference signals, beacon signals, status signals, etc.), or they may send wireless signals addressed to other devices (e.g., a user equipment, a client device, a server, etc.), and the other devices (not shown) as well as the wireless communication device 102C may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In the example shown, the wireless communication device 102C processes the wireless signals from the wireless communication devices 102A, 102B using modem parameters to detect motion of an object in a space accessed by the wireless signals. For example, the wireless communication device 102C may perform the example process 400 of FIG. 4, the example process 800 of FIG. 8, or another type of process for detecting motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the wireless communication device 102C can transmit wireless signals and the wireless communication devices 102A, 102B can processes the wireless signals from the wireless communication device 102C to detect motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, the third wireless communication device 102C may generate motion detection data. In some instances, the third wireless communication device 102C may communicate the motion detection data to another device or system, such as a security system, that may include a control center for monitoring movement within a space, such as a room, building, outdoor area, etc.

In some implementations, the wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by the third wireless communication device 102C, which may reduce the amount of processing that the third wireless communication device 102C performs for motion sensing. The header may include additional information such as, for example, an indication of whether motion was detected by another device in the communication system 100, an indication of the modulation type, an identification of the device transmitting the signal, etc.

In the example shown in FIG. 1, the wireless communication link between the third wireless communication device 102C and the first wireless communication device 102A can be used to probe a first motion detection field 110A, and the wireless communication link between the third wireless communication device 102C and the second wireless communication device 102A can be used to probe a second motion detection field 110B. In some instances, the third wireless communication device 102C detects motion in the motion detection fields 110A, 110B by processing received signals that are based on wireless signals transmitted by the wireless communication devices 102A, 102B, respectively. For example, when the person 106 shown in FIG. 1 moves in the first motion detection field 110A, the third wireless communication device 102C may detect the motion based on signals received at the third wireless communication device 102C that are based on wireless signals transmitted by the first wireless communication device 102A.

In some instances, the motion detection fields 110A, 110B can include, for example, air, solid materials, liquids, or another medium through which wireless electromagnetic signals may propagate. In the example shown in FIG. 1, the first motion detection field 110A provides a wireless communication channel between the first wireless communication device 102A and the third wireless communication device 102C, and the second motion detection field 110B provides a wireless communication channel between the second wireless communication device 102B and the third wireless communication device 102C. In some aspects of operation, wireless signals transmitted on a wireless communication channel (separate from or shared with the wireless communication channel for network traffic) are used to detect movement of an object in a space. The objects can be any type of static or moveable object, and can be living or inanimate. For example, the object can be a human (e.g., the person 106 shown in FIG. 1), an animal, an inorganic object, or another device, apparatus, or assembly), an object that defines all or part of the boundary of a space (e.g., a wall, door, window, etc.), or another type of object.

FIGS. 2A and 2B are diagrams showing example wireless signals communicated between wireless communication devices 204A, 204B, 204C. The wireless communication devices 204A, 204B, 204C can be, for example, the wireless communication devices 102A, 102B, 102C shown in FIG. 1, or other types of wireless communication devices. The example wireless communication devices 204A, 204B, 204C transmit wireless signals through a space 200. The example space 200 can be completely or partially enclosed or open at one or more boundaries of the space 200. The space 200 can be or can include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A is operable to transmit wireless signals repeatedly (e.g., periodically, intermittently, at scheduled, unscheduled or random intervals, etc.). The second and third wireless communication devices 204B, 204C are operable to receive signals based on those transmitted by the wireless communication device 204A. The wireless communication devices 204B, 204C each have a modem (e.g., the modem 112 shown in FIG. 1B) that is configured to process received motion detection signals to detect motion of an object in the space 200.

As shown, an object is in a first position 214A in FIG. 2A, and the object has moved to a second position 214B in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between FIGS. 2A and 2B, a surface of the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

In the example shown in FIGS. 2A and 2B, the first wireless communication device 204A can repeatedly transmit a wireless signal. In particular, FIG. 2A shows the wireless signal being transmitted from the first wireless communication device 204A at a first time, and FIG. 2B shows the same wireless signal being transmitted from the first wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless communication device 204A in an omnidirectional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. Assuming the same wireless signal is transmitted from the first wireless communication device 204A, if the transfer function of the space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \tag{3}$$

Substituting Equation (2) into Equation (3) renders the following Equation (4):

$$R = \sum_k \sum_{n=-\infty}^{\infty} \left(\alpha_{n,k} e^{j\phi_{n,k}}\right) c_n e^{j\omega_n t} \tag{4}$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \sum_k c_n \alpha_{n,k} e^{j\phi_{n,k}}. \tag{5}$$

The complex value $H_n$ for a given frequency component $\omega_n$ indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference or other phenomena can influence the channel response detected by the receiver, and the motion detection system can reduce or isolate such influences to improve the accuracy and quality of motion detection capabilities.

In some implementations, the channel response can be represented as:

$$h_{ch} = \sum_k \sum_{n=-\infty}^{\infty} \alpha_{n,k}. \tag{6}$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{d}$). This can be mathematically illustrated as:

$$\hat{R}_{cvd} = R_{ef} \otimes h_{ch} = \sum_{k=-m}^{m} R_{ef}(n-k) h_{ch}(k) \tag{7}$$

with the optimization criterion $$\min_{h_{ch}} \sum \left(\hat{R}_{cvd} - R_{cvd}\right)^2. \tag{8}$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like.

As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

FIGS. 2C-2D are plots showing examples of channel responses 260, 270 computed from the wireless signals communicated between wireless communication devices 204A, 204B, 204C in FIGS. 2A-2B. FIGS. 2C-2D also show a frequency domain representation 250 of an initial wireless signal transmitted by the wireless communication device 204A. The channel response 260 in FIG. 2C represents the signals received by the wireless communication device 204B in FIG. 2A (before the object has moved in the space 200), and the channel response 270 in FIG. 2D represents the signals received by the wireless communication device 204B in FIG. 2B (after the object has moved in the space 200).

In the example shown in FIGS. 2C-2D, for illustration purposes, the wireless communication device 204A transmits a signal that has a flat frequency profile (the magnitude of each frequency component $f_1$, $f_2$, and $f_3$ is the same), as shown in the frequency domain representation 250. Because of the interaction of the signal with the space 200 (and the objects therein), the signals received at the wireless communication device 204B that are based on the signal sent from the wireless communication device 204A look different from the transmitted signal. In this example, where the transmitted signal has a flat frequency profile, the received signal represents the channel response of the space 200. As shown in FIGS. 2C-2D, the channel responses 260, 270 are different from the frequency domain representation 250 of the transmitted signal. When motion occurs in the space 200, a variation in the channel response will also occur. For example, as shown in FIG. 2D, the channel response 270 that is associated with the object in its second position (as shown in FIG. 2B) varies from the channel response 260 that is associated with the object in its first position (as shown in FIG. 2A). Thus, by analyzing channel responses and variations therein, motion of an object may be detected.

FIG. 3 is a block diagram of an example system 300 for detecting motion based on different types of variations in channel responses. The example system 300 shown in FIG. 3 includes a first variation detector 304, a second variation detector 306, a gate 308, and a motion detector 310. The system may include additional or different components, and the components may operate as described with respect to FIG. 3 or in another manner. In some environments, some or all components of the system 300 are implemented in software or firmware, for example, as one or more software modules executed by the processor 114 in the wireless communication device 114 or by another type of data processing apparatus (e.g., on a server that is remote from a wireless sensor device). In some environments, some or all components of the system 300 are implemented in hardware, for example, as one or more FPGAs, ASICs or other types of programmable hardware.

In the example shown, a channel response 302 is analyzed by each of the variation detectors 304, 306. The channel response 302 is based on wireless signals transmitted through a space, and may be similar to the channel responses 260, 270 of FIGS. 2C-2D. In the example shown, the variation detectors 304, 306 are each operable to detect a different type of variation in the channel response 302. In some implementations, the first variation detector 304 is configured to detect, in the channel response 302, a type of variation that is typically attributable to interference signals (e.g., out-of-band (OOB) interference signals), while the second variation detector 306 is configured to detect, in the same channel response 302, a type of variation that is typically attributable to motion occurring in the space traversed by wireless signals. Both types of variation (the type of variation detected by the first variation detector 304 and the type of variation detected by the second variation detector 306) are variations that occur over time. For instance, the variation detectors 304, 306 can detect the respective types of variation based on analyzing (e.g., comparing, etc.) the channel response 302 with a set of previously-received channel responses.

To reduce or prevent errors in detecting motion, the magnitude of the first type of variation may be used as an input to the gate 308, which can either allow or prevent information about the second type of variation from being input to the motion detection process executed by the motion detector 310. For example, where the first type of variation represents a type of variation that is typically induced by interference signals and the second type of variation represents a type of variation that is typically induced by motion in the space, the gate 308 may only allow information about the second type of variation to be processed by the motion detector 310 where the magnitude of the first variation is below a certain threshold (which may indicate low or minimal interference). This may prevent the motion detection process from producing errors, such as false-positive detections of motion, when interference signals are present in the space. Conversely, if the magnitude of the first variation is above the threshold (which may indicate high levels of interference), then the information about the second type of variation may be blocked from processing by the motion detector 310. The motion detector 310 may accordingly be prevented from executing the motion detection process, or the motion detection process may be executed based on other inputs (e.g., from another source). In some implementations, the channel response 302 may be represented by a channel vector in a vector frequency domain, as described below. The first and second types of variations may be detected based on a projection of the channel vector onto axes in the vector frequency domain, as described below.

In some cases, interference produces an effect on the channel response that is observed predominantly as the first type of variation, relative to the second type of variation. For instance, certain types of interference may produce a primarily uniform shift in the channel response. As an example, out-of-band (OOB) or out-of-channel (OOC) interference may primarily shift all elements of the channel response up or down, which increases or decreases the channel response values, by a significant amount. In such cases, the first variation detector 304 can monitor for uniform shifts in the channel response (e.g., uniform increases or decreases by an amount greater than a threshold).

In some cases, motion of objects in the space produces an effect on the channel response that is observed predominantly as the second type of variation, relative to the first type of variation. For instance, motion in the space may primarily shift only a subset of values in the channel response. As an example, the motion may primarily change the phase or magnitude of one or two elements of the channel response, and therefore non-uniformly increase or decrease the channel response. In such cases, the second variation detector 306 can monitor for non-uniform shifts in the channel response (e.g., non-uniform increases or decreases by an amount greater than a threshold).

In some cases, interference produces a secondary effect that can be observed as the second type of variation. Accordingly, when significant interference is observed by the first variation detector 304, the gate 308 can prevent the motion detector 310 from executing a motion detection process based on the channel response 302. When significant interference is not observed by the first variation detector 304, the gate 308 can allow the motion detector 310 to execute the motion detection process based on the channel response 302 (e.g., by analyzing the variations observed by the second variation detector 306).

Figure 4:
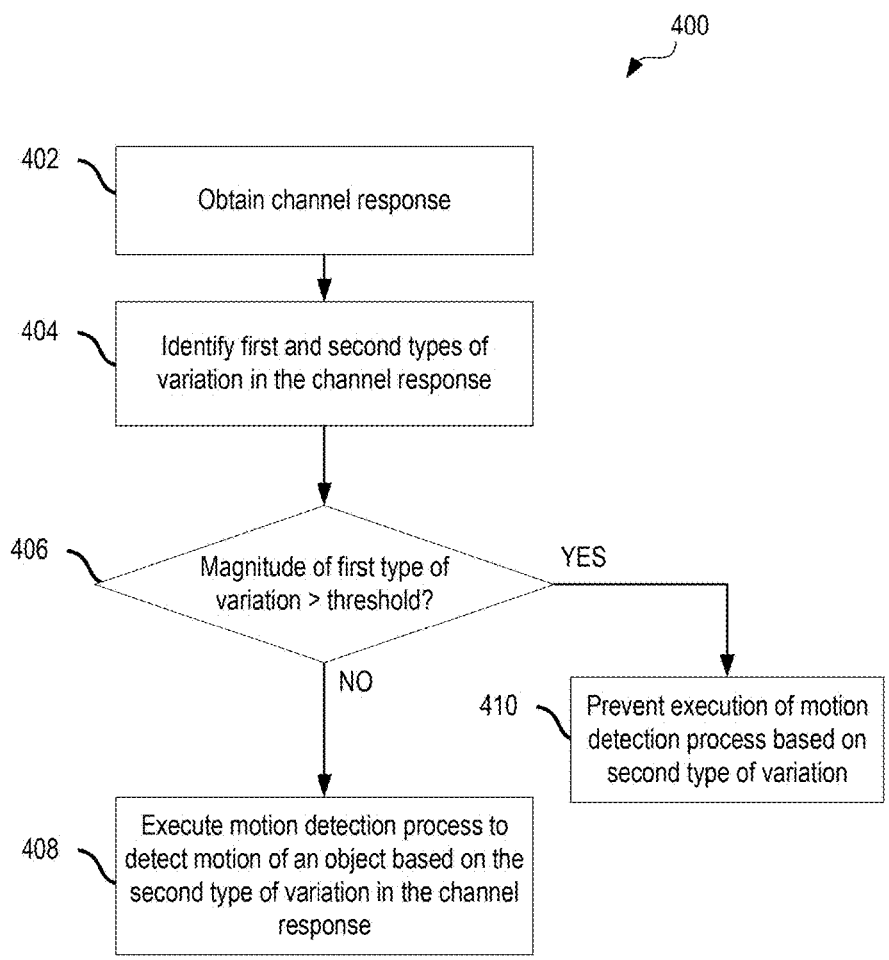
FIG. 4 is a flow diagram showing an example process for detecting motion based on different types of variations in channel responses.

FIG. 4 is a flow diagram showing an example process 400 for detecting motion based on different types of variations in channel responses. Operations in the example process 400 may be performed by a data processing apparatus to detect motion of an object in a space. For example, operations in the process 400 may be performed by the example system 300 shown in FIG. 3 or another type of system. Referring to the example shown in FIG. 1, operations of the example process 400 may be performed by the processor 114 of the wireless communication device 102C to detect motion of the person 106 based on channel responses associated with wireless signals transmitted from one or both of the wireless communication devices 102A, 102B. In some instances, the example process 400 is performed by a system other than the wireless communication devices, such as a server or other computing device communicatively coupled to the wireless communications devices. The example process 400 may be performed by another type of device. The example process 400 may include additional or different operations, and the operations may be performed in the order shown or in another order. In some cases, one or more of the operations shown in FIG. 4 are implemented as processes that include multiple operations, sub-processes or other types of routines. In some cases, operations can be combined, performed in another order, performed in parallel, iterated, or otherwise repeated or performed another manner.

At 402, a channel response is obtained. The channel response may be based on wireless signals transmitted through a space by a wireless communication device. For example, referring to FIGS. 2A-2B, the channel response may be based on the wireless signals transmitted through the space 200 by the wireless communication device 204A and received at one of the wireless communication devices 204B, 204C. The channel response may include a series of complex values for each of several subcarrier frequencies in a frequency range. For example, referring to FIGS. 2C-2D, the channel response may include complex values for each of the subcarrier frequencies $f_1$, $f_2$, and $f_3$. In some examples, the channel response is defined over another number of subcarrier frequencies (e.g., 12, 16, 32, or another number of subcarrier frequencies).

At 404, a first and second type of variation are identified in the channel response. The first and second type of variation may be identified by analyzing (e.g., comparing or otherwise analyzing) the channel response obtained at 402 with a set of previously-obtained channel responses. In some implementation, the first type of variation includes a variation typically seen in channel responses when interference is present in the space, and the second type of variation includes a type of variation typically seen in channel responses associated with motion. As described below, the two variation types may be based on variations detected in a frequency vector domain.

At 406, a magnitude of the first type of variation is compared with a threshold. The threshold may be based on a magnitude of variation seen in interference signals that can affect (e.g., produce errors in) a motion detection process. If the magnitude is below the threshold (e.g., indicating that any interference in the space is unlikely to affect the motion detection process), then a motion detection process is executed at 408 to detect motion of an object based on the second type of variation. The motion detection process may compare information about the second type of variation (e.g., complex frequency components) with information about previously-obtained channel responses to determine whether the second type of variation indicates motion of an object in the space. For example, the motion detection process may analyze one or more statistical parameters of the channel response obtained at 402 (e.g., statistical parameters of frequency components of the channel response) to determine whether an object is moving in the space. If, however, the magnitude of the first type of variation is above the threshold, then the motion execution process is prevented from being executed based on the second type of variation at 410. For example, information about the second type of variation may be discarded or otherwise not considered in the motion detection process.

Figure 5A:
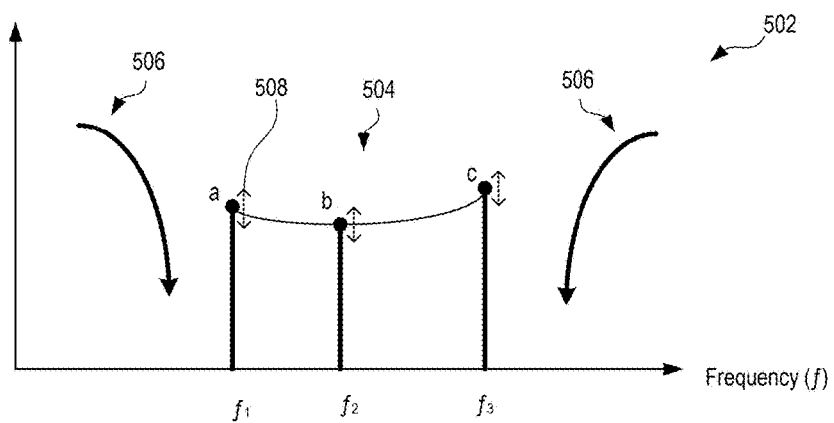
FIGS. 5A-5B are diagrams showing an example channel response and a vector representation of the channel response in a frequency vector domain.
Figure 5B:
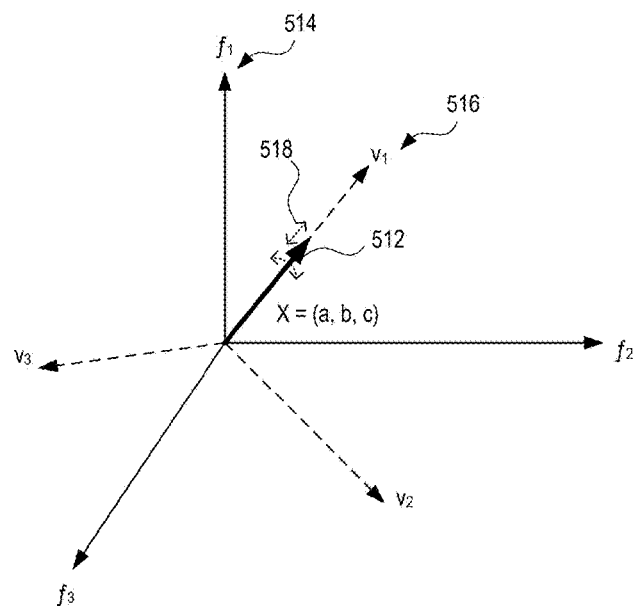

FIGS. 5A-5B are diagrams showing an example channel response 504 and a vector representation 512 of the channel response 504 in a frequency vector domain 514. The plot 502 in FIG. 5A includes the example channel response 504 and out-of-band (OOB) or out-of-channel (OOC) interferers 506 acting upon the channel response 504. In the example shown, the channel response 504 includes frequency components (a, b, c) at certain subcarrier frequencies ($f_1$, $f_2$, $f_3$) (respectively), obtained from analysis of the received wireless signals. The frequency components may be complex values that include a magnitude and phase. In some instances, the frequency components represent sampled values of the channel response at the different subcarrier frequencies. The channel response 504 can be represented in vector form based on the frequency components at subcarrier frequencies. For instance, in the example shown in FIG. 5B, the channel response 504 is represented by the vector X=(a, b, c), and mapped to the frequency vector domain 514 defined by the mutually orthogonal axes ($f_1$, $f_2$, $f_3$).

In the examples shown, the channel response 504 represents a steady-state channel response seen by a wireless communication device for a space without the interferers 506 present. When the interferers 506 are present as shown in FIG. 5A, however, the channel response 504 may undergo slight variations similar to those indicated by the dotted lines 508. For example, the interferers 506 may cause a change in the effective gain of the radio subsystem of the wireless communication device, which may in turn cause the magnitude changes shown by the dotted lines 508. These changes may be uniform across the frequency spectrum or non-uniform (e.g., the gain change can be different for different frequency components).

Channel responses undergoing these variations are mapped to channel vectors that are substantially aligned with a single direction in the frequency vector domain. For example, the channel vector 512 undergoes variations in the frequency vector domain as shown by the dotted lines 518 in FIG. 5B, but stays substantially aligned with (i.e. parallel to) the direction indicated by the axis $v_1$ throughout the variations. For example, while undergoing the variations, the projection of the channel vector 512 onto the axis $v_1$ will be approximately greater than 90% of the magnitude of the channel vector 512, and the projection of the channel vector 512 onto the axes $v_2$ and $v_3$ will be small. When motion occurs in the space, however, the channel response may undergo a much different variation, and the channel vector associated with the motion-based channel response may project in one or more other directions that are orthogonal to the direction indicated by axis $v_1$. For example, a channel response associated with motion in the space may have a channel vector that projects substantially onto both the $v_2$ and $v_3$ axes shown in FIG. 5B (which are orthogonal to the axis $v_1$).

Thus, in some implementations, a motion detection process may determine and establish a set of orthogonal axes in the frequency vector domain based on previously-obtained channel responses. A newly-obtained channel response may then be converted to a channel vector in the domain defined by those axes in order to detect whether motion has occurred in the space. For instance, in the example shown, the frequency vector domain 516 defined by axes ($v_1$, $v_2$, $v_3$) may be determined and established based on a set of previously-obtained channel responses that are similar to the channel response 504 of FIG. 5A (e.g., a set of channel responses undergoing the same variations shown by lines 508). A first axis $v_1$ may be defined based on a direction in which the channel undergoes typical perturbations when no motion is present (e.g., based on the primary direction in which a set of channel vectors aligns), and the axes $v_2$ and $v_3$ may be defined as orthogonal to the axis $v_1$ (and to each other). With an orthogonal direction chosen for the axis $v_2$, a variation in the channel caused by interference may have a small projection in the direction of the axis $v_2$. And because the axis $v_3$ is orthogonal to both $v_1$ and $v_2$, a variation in the channel caused by interference may have zero to a negligible amount of projection in its direction. Thus, in some implementations, the axis $v_3$ or another axis that is orthogonal to the axis $v_1$, may be used as a discriminator that will remain relatively silent (e.g., small projections of the channel vector) to interference but will react strong when motion occurs in the space. In some implementations, the axes may not be perfectly orthogonal to one another. Rather, as long as each axis is sufficiently close to the null space of span of the other axes, the techniques described herein may allow for discriminating between interference- and motion-based channel variations.

Accordingly, in some implementations, when a new channel response is obtained, it may be mapped as a channel vector in the domain 516 to determine projections onto the axes of the domain 516. If the channel vector projects substantially onto the axis v1 and only negligibly onto the axes $v_2$ and $v_3$ (e.g., a magnitude of the projection onto each of axes $v_2$ and $v_3$ is less than 5% of the magnitude of the channel vector itself), then the motion detection process may determine that no motion has occurred in the space. If, however, the channel vector projects more substantially onto one or both of the axes $v_2$ and $v_3$, then the motion detection process may determine that motion has occurred in the space. FIGS. 6-7 describe examples of newly-received channel responses being analyzed according to these techniques.

In some instances, the axis chosen for detecting motion may be determined based on a fat-tail metric. Random spikes seen in the channel vectors in the directions of different axes can be measured by a fat-tail calculator, which can determine a probability density of outliers. In some instances, the fat-tail metric includes a ratio of a mean absolute deviation (which measures an average absolute distance between a random variable and its mean) to a standard deviation (which measures an average squared distance between a random variable and its mean). Because this ratio is disproportionally affected by outliers in the sample, the closer the ratio is to zero (fatter tails in the distribution), the more instantaneous the interferer. Thus, the axis for detecting motion may be chosen as the axis that has the lowest fat-tail metric.

In some instances, the projection of new channel vectors may be sampled to determine if any change has occurred in the channel (e.g., whether new interferers are present). A new selection of the axis for detecting motion may be performed when a change is detected in the projection of the first principal component (the component that defines the first axis). The change may be detected based on a density function, or another robust statistical estimator.

The axes of the frequency vector domain 516 of FIGS. 5-7 may be determined using an iterative estimation process. For example, in some implementations, the axes of the frequency vector domain 516 are determined by reducing the expected value of residual errors based on projections of channel vectors onto the axes. This can be done, in some implementations, by minimizing Equation (9):

$$J_i(v_i) = E\{\|x - v_i(v_i^T x)\|\} \qquad (9)$$

subject to:

$$v_i v_j = \begin{cases} 1 \text{ if } i = j \\ 0 \text{ if } i \neq j \end{cases} \qquad (10)$$

where E{ } represents an error function, x represents a channel vector, $v_1$ represents the i-th axis in the frequency vector domain, and Equation (10) constrains Equation (9) to determine axes that are orthogonal to one another. In some instances, the axes may be determined through a set of successive updates, with a recursive forgetting factor that holds long-term trends. In some implementations, the axes are determined using a least squares method, such as, for example, a recursive least squares method, a constrained least squares method, a batch least squares method, or another type of least squares method.

In some implementations, the axes of the frequency vector domain may be updated as new channel responses are obtained. In some instances, the axes may be updated using a mean square error stochastic update method. For example, the first axis may be updated according to Equations (11) and (12):

$$y_1 = v_1^T x(k) \qquad (11)$$

$$v_1(k+1) = v_1(k) + \mu_1 y_1 [x(k) - v_1(k) y_1] \qquad (12)$$

the second axis may be updated according to Equations (13)-(15), $$x_2 = x(k) - v_1 y_1 \qquad (13)$$

$$y_2 = v_2^T x_2 \qquad (14)$$

$$v_2(k+1) = v_2(k) + \mu_2 y_2 [x_2 - v_2 y_2] \qquad (15)$$

and the third axis may be updated according to Equations (16)-(18)

$$x_3 = x_2 - v_2 y_2 \qquad (16)$$

$$y_3 = v_3^T x_3 \qquad (17)$$

$$v_3(k+1) = v_3(k) + \mu_3 y_3 [x_3 - v_3 y_3] \qquad (18)$$

where x(k) represents an instantaneous channel vector, $y_i$ represents a projection of the channel vector in the direction of the i-th axis, $\mu_3$ represents a forgetting factor, and $v_1$ (k+1)

represents the updated direction of the axis $v_1$. In frequency vector domains of higher dimension, the additional axes (e.g., the fourth axis, and so on) may be updated in a similar manner.

Generally, a channel response can include an integer n number of points and may be represented in an n-dimensional frequency vector domain, and n orthogonal axes can be defined in the n-dimensional frequency vector domain. For example, when analyzing channel responses that each have 16 points, 16-element frequency vectors can be defined in a 16-dimensional frequency vector domain, In some cases, less than n orthogonal axes are used to analyze variations in the channel response. For example, when analyzing channel responses that each have 16 points, in some cases motion can be detected accurately using only a small number (e.g., 2, 3, 4, 5) of orthogonal axes in the frequency vector domain.

Figure 6A:
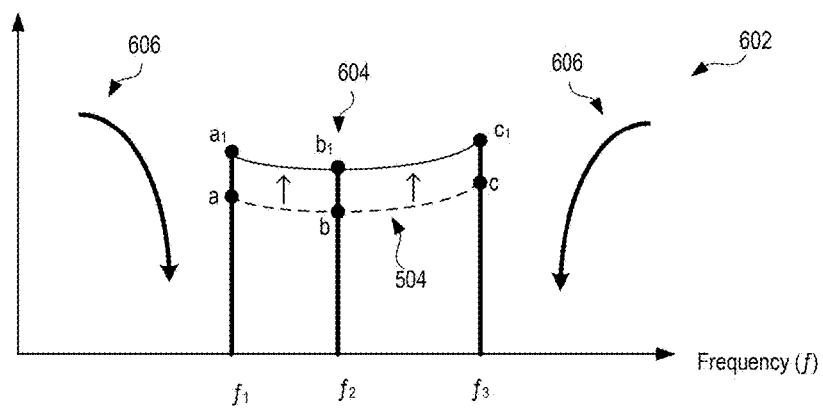
FIGS. 6A-6B are diagrams showing an example channel response and a vector representation of the channel response in the frequency vector domain of FIG. 5B.
Figure 6B:
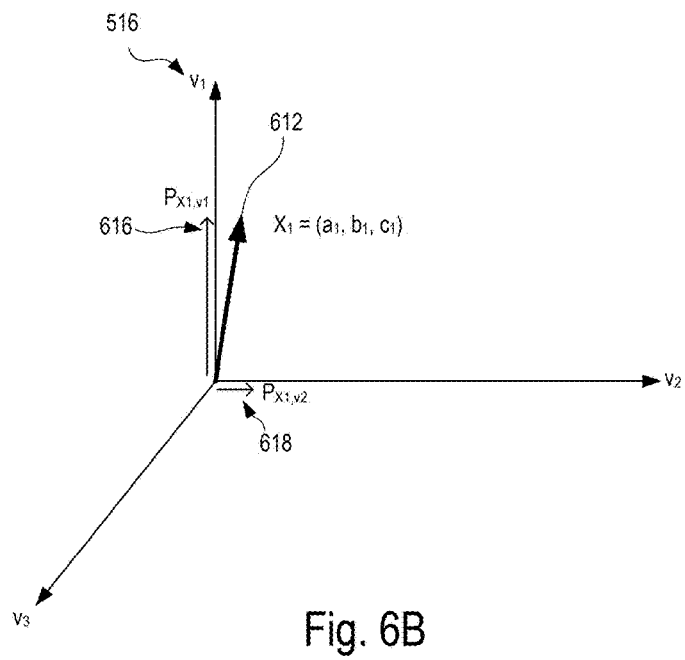

FIGS. 6A-6B are diagrams showing an example channel response 604 and a vector representation 612 of the channel response 604 in the frequency vector domain 516 of FIG. 5B. In the example shown, the channel response 604 represents the channel response 504 as influenced by the interferers 606, which may be similar to or the same as the interferers 506 of FIG. 5A. As shown, the example channel response 604 varies from the channel response 504 of FIG. 5B by a slight increase in magnitude across the frequency range (across the frequency domain of the channel response 604). Like the channel response 504, the channel response 604 may be represented in vector form based on the frequency components at sub carrier frequencies. For instance, in the example shown in FIG. 6B, the channel response 604 is represented by the vector $X_1=(a_1, b_1, c_1)$, and mapped to the frequency vector domain 516 defined by the axes ($v_1, v_2, v_3$). When mapped to the frequency vector domain 516 as shown in FIG. 6B, the channel vector 612 representing the channel response 604 is substantially aligned with the axis $v_1$, creating a large projection 616 on the $v_1$ axis, a relatively small projection 618 on the $v_2$ axis, and no projection on the $v_3$ axis. Because the channel vector 612 does not project onto the axis $v_3$, in the example shown, a motion detection process may determine that the channel response 604 does not indicate motion in a space, and rather indicates variations in the channel response based on other effects (e.g., interferers 606).

Figure 7A:
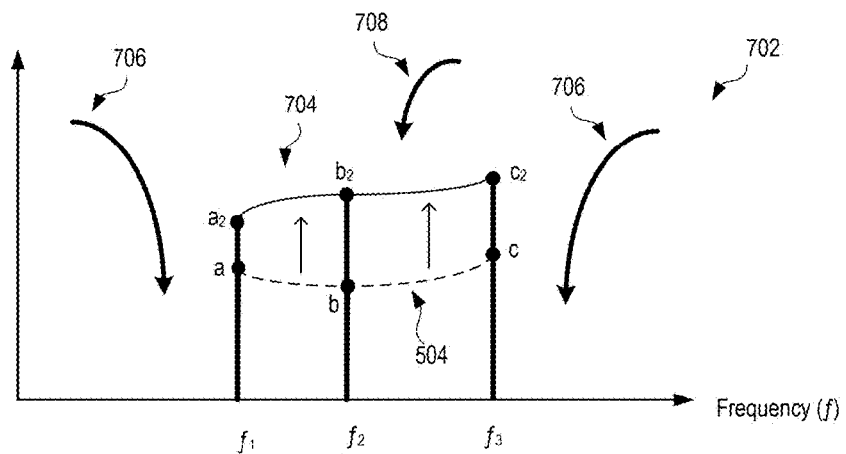
FIGS. 7A-7B are diagrams showing an example channel response and a vector representation of the channel response in the frequency vector domain.
Figure 7B:
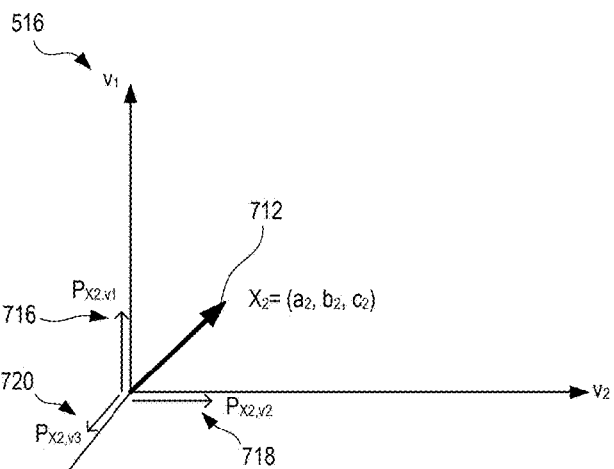

FIGS. 7A-7B are diagrams showing an example channel response 704 and a vector representation 712 of the channel response 704 in the frequency vector domain 516. In the example shown, the channel response 704 represents the channel response 504 as influenced by the interferers 706, which may be similar to or the same as the interferers 506 of FIG. 5A, and the signal 708. As shown, the example channel response 704 varies from the channel response 504 of FIG. 5B non-uniformly across the frequency range. Like the channel response 604, the channel response 704 may be represented in vector form based on the frequency components at subcarrier frequencies. For instance, in the example shown in FIG. 7B, the channel response 704 is represented by the vector $X_2=(a_2, b_2, c_2)$, and mapped to the frequency vector domain 516 defined by the axes ($v_1, v_2, v_3$). When mapped to the frequency vector domain 516 as shown in FIG. 7B, the channel vector 712 representing the channel response 704 creates a projection 716 on the $v_1$ axis, a projection 718 on the $v_2$ axis, and a projection 720 on the $v_3$ axis. In the example shown, a motion detection process may determine that the channel response 704 indicates motion of an object in a space rather than just variations in the channel response based on other effects (e.g., the interferers 706) because the channel vector 712 creates the projection 720 onto the axis $v_3$.

Although the frequency vector domain 516 in the examples shown in FIGS. 5-7 is based on three subcarrier frequencies (for ease of illustration), the frequency vector domain (and thus, the channel vectors representing the channel responses) may be based on any number of subcarrier frequencies (and thus axes), such as 4, 8, 16, or 32 subcarrier frequencies or axes. In addition, while the examples above explain that motion can be inferred based upon projections in one of the axes orthogonal to axis $v_1$, motion may be inferred by projections in any axis or any combination of axes in the frequency vector domain.

Figure 8:
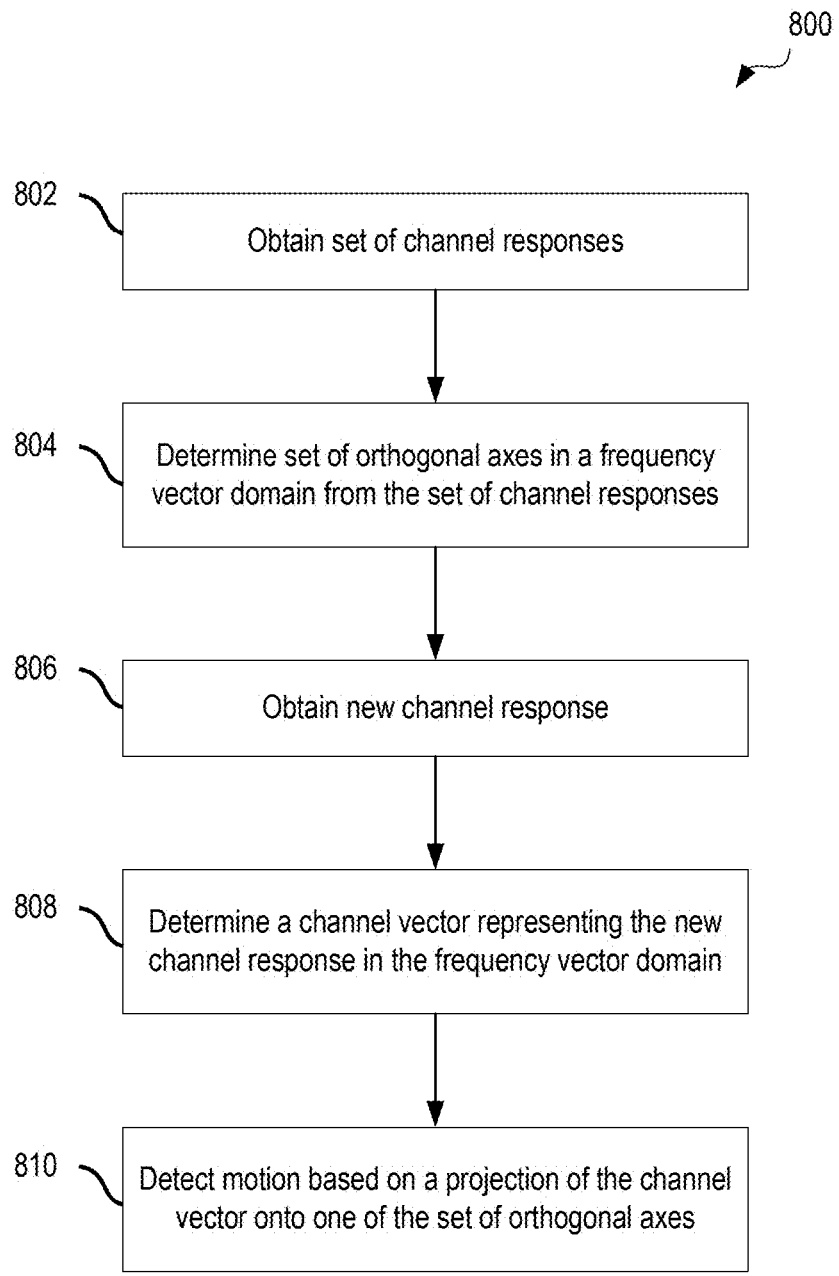
FIG. 8 is a flow diagram showing an example process for detecting motion based on different types of variations in channel responses

FIG. 8 is a flow diagram showing an example process 800 for detecting motion based on different types of variations in channel responses. Operations in the example process 800 may be performed by a data processing apparatus to detect motion of an object in a space. For example, operations in the process 800 may be performed by the example system 300 shown in FIG. 3 or another type of system. Referring to the example shown in FIG. 1, operations of the example process 800 may be performed by the processor 114 of the wireless communication device 102C to detect motion of the person 106 based on channel responses associated with wireless signals transmitted from one or both of the wireless communication devices 102A, 102B. In some instances, the example process 800 is performed by a system other than the wireless communication devices, such as a server or other computing device communicatively coupled to the wireless communications devices. The example process 800 may be performed by another type of device. The example process 800 may include additional or different operations, and the operations may be performed in the order shown or in another order. In some cases, one or more of the operations shown in FIG. 8 are implemented as processes that include multiple operations, sub-processes or other types of routines. In some cases, operations can be combined, performed in another order, performed in parallel, iterated, or otherwise repeated or performed another manner.

At 802, a set of channel responses is obtained. The channel responses may be based on wireless signals transmitted through a space during a first time period by a wireless communication device. For example, referring to FIGS. 2A-2B, the channel response obtained at 802 may be based on the signals received at one of the wireless communication devices 204B, 204C, which are based on the wireless signals transmitted through the space 200 by the wireless communication device 204A. The channel response may include values for certain subcarrier frequencies within a frequency range. For example, referring to FIGS. 2C-2D, the channel response may include values of subcarrier frequencies $f_1$, $f_2$, and $f_3$, or additional subcarrier frequencies.

At 804, a set of orthogonal axes in a frequency vector domain is determined from the set of channel responses. The set of channel responses may be based on a set of previously received signals, and the axes may be determined by minimizing a vector equation using a least squares process, such as, for example, a least mean squares process, recursive least squares process, a constrained least squares process, or a batch least squares process. For example, the axes may be determined by minimizing Equation (9) above. In some implementations, determining the axes includes defining a first axis in the frequency vector domain based on alignments of channel vectors representing the channel responses obtained at 802 in the frequency vector domain, and defining second axes in the frequency vector domain that are each orthogonal to the first axis and to the other second axes. For instance, referring to the example shown in FIGS. 5A-5B, the axis $v_1$ represents a primary direction in which the channel responses align in the frequency vector domain, and the axes $v_2$ and $v_3$ may then be defined as being orthogonal to the axis $v_1$ as well as orthogonal to each other.

One of the axes may be selected as a motion projection axis, and motion may be detected based on projections of newly-obtained channel vectors onto the motion projection axis. For instance, in the examples shown in FIGS. 6-7, the axis $v_3$ is chosen as the motion projection axis, and motion is detected based on projections onto that axis. The motion projection axis may be selected by determining a fat-tail metric for each axis of the set of orthogonal axes. The fat-tail metric for each axis may be based on a distribution of projections onto the axis of vectors representing the channel responses obtained at 802 in the frequency vector domain. In some implementations, the fat-tail metric for each axis is based on a mean absolute deviation of the distribution of projections onto the axis divided by a standard deviation of the distribution of projections onto the axis.

At 806, a new channel response is obtained. The new channel response may be based on wireless signals transmitted through the space during a second time period (after the first time period). At 808, a channel vector representing the new channel response in the frequency vector domain is determined. The elements of the channel vector may be based on frequency components of received wireless signals at respective subcarrier frequencies. For example, referring to the example shown in FIGS. 7A-7B, the elements of the channel vector $X_2$ are the frequency components $a_2$, $b_2$, and $c_2$ at the subcarrier frequencies $f_1$, $f_2$, and $f_3$ of the channel response 704, and the channel vector 712 represents the channel response 704 in the frequency vector domain.

At 810, motion that occurred (e.g., between the first and second time periods) is detected based on a projection of the channel vector onto one of the set of orthogonal axes. Motion may be detected based on a projection of the channel vector determined at 808 onto the motion projection axis selected at 804. In some instances, motion may be detected based on a comparison with a threshold value for the projection onto the selected axis. For instance, referring to the example shown in FIGS. 7A-7B, where the axis $v_3$ is selected as the motion projection axis, motion may be detected based on the channel response 704 since the magnitude of the projection 720 (onto the axis $v_3$) is above a certain threshold value.

In some implementations, the set of axes may be updated based on newly obtained channel responses. For example, third channel responses may be obtained based on wireless signals transmitted through the space during a third time period. The third channel responses may be represented as channel vectors in the frequency vector domain. If a change is detected in the projections of the channel vectors onto the axes, then a second (updated) set of orthogonal axes may be determined in the frequency vector domain. The second set of axes may be determined in the same manner as the first set of axes, such as by minimizing a vector equation such as Equation (9).

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer-readable storage medium for execution by, or to control the operation of, data-processing apparatus. A computer-readable storage medium can be, or can be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The computer-readable storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media, and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an inter-network (e.g., the Internet), a network that includes a satellite link, and peer-to-peer networks (e.g., ad hoc peer-to-peer networks). A relationship of client and server may arise by virtue of computer programs running on the respective computers and having a client-server relationship to each other.

In a general aspect of the examples described, motion is detected based on variations in channel responses.

In a first example, a first set of channel responses is obtained based on wireless signals transmitted through a space during a first time period. A set of orthogonal axes in a frequency vector domain is determined from the first set of channel responses by operation of one or more processors. A second channel response is obtained based on a wireless signal transmitted through the space during a second time period, and a channel vector representing the second channel response in the frequency vector domain is determined by operation of one or more processors. Motion of an object in the space is detected based on a projection of the channel vector onto one of the set of orthogonal axes.

Implementations of the first example may, in some cases, include one or more of the following features. Motion of the object in the space may be detected based on comparing the projection with a threshold value. Determining the set of orthogonal axes in the frequency vector domain may include minimizing a vector equation using a least squares process. The least squares process may include at least one of a least mean squares process, recursive least squares process, a constrained least squares process, or a batch least squares process. A motion projection axis may be selected from the set of orthogonal axes, and detecting motion of the object in the space may be based on a projection of the channel vector on the motion projection axis. The motion projection axis may be selected by determining a fat-tail metric for each axis of the set of orthogonal axes. The fat-tail metric for each axis may be based on a distribution of projections onto the axis of vectors representing the first channel responses in the frequency vector domain. The fat-tail metric for each axis may be based on a mean absolute deviation of the distribution of projections onto the axis divided by a standard deviation of the distribution of projections onto the axis.

Implementations of the first example may, in some cases, include one or more of the following features. Determining the set of orthogonal axes in the frequency vector domain may include determining channel vectors representing the first set of channel responses in the frequency vector domain, defining a first axis in the frequency vector domain based on alignments of the channel vectors in the frequency vector domain, and defining second axes in the frequency vector domain. Each of the second axes may be orthogonal to the first axis and orthogonal to the other second axes. The set of orthogonal axes may be a first set of orthogonal axes, and third channel responses may be obtained based on wireless signals transmitted through the space during a third time period. In response to detecting a change in projections onto the first set of orthogonal axes of vectors representing the third channel responses, a second set of orthogonal axes in the frequency vector domain may be determined from the third channel responses. The second set of orthogonal axes may be used to detect motion of an object in the space. Elements of the channel vector may be based on analysis of received wireless signals at respective subcarrier frequencies.

In a second example, a channel response is obtained based on a wireless signal transmitted through a space. A first and second type of variation are identified in the channel response based on a comparison of the channel response with a set of channel responses, and a motion detection process is executed, by operation of one or more processors, to detect motion of an object in the space based on identifying the first and second type of variation in the channel response.

Implementations of the second example may, in some cases, include one or more of the following features. Motion of the object in the space may be detected by analyzing the second type of variation identified in the channel response. The motion detection process may be executed in response to a determination that a magnitude of the first type of variation is below a threshold. The first and second types of variation may be identified based on a set of orthogonal axes in a frequency vector domain. The channel response may be a first channel response based on a first wireless signal transmitted through the space. A second channel response may be obtained based on a second wireless signal transmitted through the space, and the first and second type of variation may be identified in the second channel response based on a comparison of the second channel response with the set of channel responses. Execution of the motion detection process may be blocked in response to a determination that a magnitude of the first type of variation in the second channel response is above a threshold.

In some implementations, a computer-readable storage medium stores instructions that are operable when executed by a data processing apparatus to perform one or more operations of the first or second example. In some implementations, a system includes a data processing apparatus and a computer-readable storage medium storing instructions that are operable when executed by the data processing apparatus to perform one or more operations of the first or second example.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A motion detection method comprising:
    obtaining a first set of channel responses based on wireless signals transmitted through a space during a first time period;
    by operation of one or more processors, determining, from the first set of channel responses, a set of orthogonal axes in a frequency vector domain;
    obtaining a second channel response based on a wireless signal transmitted through the space during a second time period;
    by operation of one or more processors, determining a channel vector representing the second channel response in the frequency vector domain; and
    detecting motion of an object in the space based on a projection of the channel vector onto one of the set of orthogonal axes,
    wherein determining the set of orthogonal axes in the frequency vector domain comprises minimizing a vector equation using a least squares process.

2. The method of claim 1, wherein detecting motion of the object in the space is based on comparing the projection with a threshold value.

3. The method of claim 1, wherein the least squares process comprises at least one of a least mean squares process, recursive least squares process, a constrained least squares process, or a batch least squares process.

4. The method of claim 1, comprising selecting a motion projection axis from the set of orthogonal axes, wherein detecting motion of the object in the space is based on a projection of the channel vector on the motion projection axis.

5. The method of claim 4, wherein selecting the motion projection axis comprises determining a fat-tail metric for each axis of the set of orthogonal axes, the fat-tail metric for each axis based on a distribution of projections onto the axis of vectors representing the first channel responses in the frequency vector domain.

6. The method of claim 5, wherein the fat-tail metric for each axis is based on a mean absolute deviation of the distribution of projections onto the axis divided by a standard deviation of the distribution of projections onto the axis.

7. The method of claim 1, wherein determining the set of orthogonal axes in the frequency vector domain comprises:
    determining channel vectors representing the first set of channel responses in the frequency vector domain;
    defining a first axis in the frequency vector domain based on alignments of the channel vectors in the frequency vector domain; and
    defining second axes in the frequency vector domain, each of the second axes being orthogonal to the first axis and orthogonal to the other second axes.

8. The method of claim 1, wherein the set of orthogonal axes is a first set of orthogonal axes, and the method comprises:
    obtaining third channel responses based on wireless signals transmitted through the space during a third time period;
    determining, from the third channel responses, in response to detecting a change in projections onto the first set of orthogonal axes of vectors representing the third channel responses, a second set of orthogonal axes in the frequency vector domain; and
    using the second set of orthogonal axes to detect motion of an object in the space.

9. The method of claim 1, wherein elements of the channel vector are based on analysis of received wireless signals at respective subcarrier frequencies.

10. A system comprising:
    a data processing apparatus; and
    a computer-readable storage medium storing instructions that are operable when executed by the data processing apparatus to perform operations comprising:
        obtaining a first set of channel responses based on wireless signals transmitted through a space during a first time period;
        determining, from the first set of channel responses, a set of orthogonal axes in a frequency vector domain;
        obtaining a second channel response based on a wireless signal transmitted through the space during a second time period;
        determining a channel vector representing the second channel response in the frequency vector domain; and
        detecting motion of an object in the space based on a projection of the channel vector onto one of the set of orthogonal axes,
        wherein determining the set of orthogonal axes in the frequency vector domain comprises minimizing a vector equation using a least squares process.

11. The system of claim 10, wherein detecting motion of the object in the space is based on comparing the projection with a threshold value.

12. The system of claim 10, wherein the least squares process comprises at least one of a least mean squares process, recursive least squares process, a constrained least squares process, or a batch least squares process.

13. The system of claim 10, the operations comprising selecting a motion projection axis from the set of orthogonal axes, wherein detecting motion of the object in the space is based on a projection of the channel vector on the motion projection axis.

14. The system of claim 13, wherein selecting the motion projection axis comprises determining a fat-tail metric for each axis of the set of orthogonal axes, the fat-tail metric for each axis based on a distribution of projections onto the axis of vectors representing the first channel responses in the frequency vector domain.

15. The system of claim 14, wherein the fat-tail metric for each axis is based on a mean absolute deviation of the distribution of projections onto the axis divided by a standard deviation of the distribution of projections onto the axis.

16. The system of claim 10, wherein determining the set of orthogonal axes in the frequency vector domain comprises:
   determining channel vectors representing the first set of channel responses in the frequency vector domain;
   defining a first axis in the frequency vector domain based on alignments of the channel vectors in the frequency vector domain; and
   defining second axes in the frequency vector domain, each of the second axes being orthogonal to the first axis and orthogonal to the other second axes.

17. The system of claim 10, wherein the set of orthogonal axes is a first set of orthogonal axes, and the operations comprise:
   obtaining third channel responses based on wireless signals transmitted through the space during a third time period;
   determining, from the third channel responses, in response to detecting a change in projections onto the first set of orthogonal axes of vectors representing the third channel responses, a second set of orthogonal axes in the frequency vector domain; and
   using the second set of orthogonal axes to detect motion of an object in the space.

18. The system of claim 10, wherein elements of the channel vector are based on analysis of received wireless signals at respective subcarrier frequencies.

19. A motion detection method comprising:
   obtaining a first channel response based on a first wireless signal transmitted through a space;
   identifying a first type of variation and a second type of variation in the first channel response based on a comparison of the first channel response with a set of channel responses;
   by operation of one or more processors, executing a motion detection process to detect motion of an object in the space based on identifying the first and second types of variations in the channel response;
   obtaining a second channel response based on a second wireless signal transmitted through the space;
   identifying the first and second type of variation in the second channel response based on a comparison of the second channel response with the set of channel responses; and
   blocking execution of the motion detection process in response to a determination that a magnitude of the first type of variation in the second channel response is above a threshold.

20. The method of claim 19, wherein motion of the object in the space is detected by analyzing the second type of variation identified in the channel response.

21. The method of claim 20, wherein the motion detection process is executed in response to a determination that a magnitude of the first type of variation is below a threshold.

22. The method of claim 19, wherein the first and second types of variation are identified based on a set of orthogonal axes in a frequency vector domain.

23. A system comprising:
   a data processing apparatus; and
   a computer-readable storage medium storing instructions that are operable when executed by the data processing apparatus to perform operations comprising:
      obtaining a first channel response based on a first wireless signal transmitted through a space;
      identifying a first type of variation and a second type of variation in the first channel response based on a comparison of the first channel response with a set of channel responses;
      executing a motion detection process to detect motion of an object in the space based on identifying the first and second types of variations in the channel response;
      obtaining a second channel response based on a second wireless signal transmitted through the space;
      identifying the first and second type of variation in the second channel response based on a comparison of the second channel response with the set of channel responses; and
      blocking execution of the motion detection process in response to a determination that a magnitude of the first type of variation in the second channel response is above a threshold.

24. The system of claim 23, wherein motion of the object in the space is detected by analyzing the second type of variation identified in the channel response.

25. The system of claim 24, wherein the motion detection process is executed in response to a determination that a magnitude of the first type of variation is below a threshold.

26. The system of claim 23, wherein the first and second types of variation are identified based on a set of orthogonal axes in a frequency vector domain.

* * * * *

UNITED STATES PATENT AND TRADEMARK OFFICE
CERTIFICATE OF CORRECTION

| | |
|---|---|
| PATENT NO. | : 10,051,414 B1 |
| APPLICATION NO. | : 15/691195 |
| DATED | : August 14, 2018 |
| INVENTOR(S) | : Mohammad Omer and Christopher Vytautas Olekas |

Page 1 of 1

It is certified that error appears in the above-identified patent and that said Letters Patent is hereby corrected as shown below:

In the Specification

Column 10, Line 49, delete "($R^*_d$)." and insert --($\hat{R}_{cvd}$).-- therefor.

Column 16, Line 31, delete "$v_1$" and insert --$v_i$-- therefor.

Signed and Sealed this
Sixth Day of November, 2018

Andrei Iancu
*Director of the United States Patent and Trademark Office*